United States Patent [19]
Matsuno

[11] Patent Number: 4,735,131
[45] Date of Patent: Apr. 5, 1988

[54] BLOWOUT APPARATUS
[75] Inventor: Yoshio Matsuno, Machida, Japan
[73] Assignee: Nissan Motor Co., Ltd., Yokohama, Japan
[21] Appl. No.: 8,566
[22] Filed: Jan. 29, 1987
[30] Foreign Application Priority Data Feb. 3, 1986 [JP] Japan .................................. 61-21589

[51] Int. Cl.⁴ ............................................. F24F 13/15
[52] U.S. Cl. ......................................... 98/40.27; 98/2
[58] Field of Search ....................... 98/2, 40.24, 40.26, 98/40.27

[56] References Cited
U.S. PATENT DOCUMENTS 3,366,363  1/1968  Hogan et al. ............................. 98/2
4,092,907  6/1978  Meyer et al. ............................. 98/2
4,665,804  5/1987  Miyasaka ................................. 98/2

FOREIGN PATENT DOCUMENTS 60-45115  3/1985  Japan .

Primary Examiner—Albert J. Makay
Assistant Examiner—David W. Westphal
Attorney, Agent, or Firm—Schwartz, Jeffery, Schwaab, Mack, Blumenthal & Evans

[57] ABSTRACT

A blow-out apparatus comprises a housing having a blow-out port, a plurality of guide members for adjusting the direction of the air flow blown out of the blow-out port of the housing, and a device for preventing the direction of the air flow flowing through the guide members from being disturbed by the air flow between the housing and the guide members adjacent the housing.

3 Claims, 3 Drawing Sheets

FIG. I
PRIOR ART
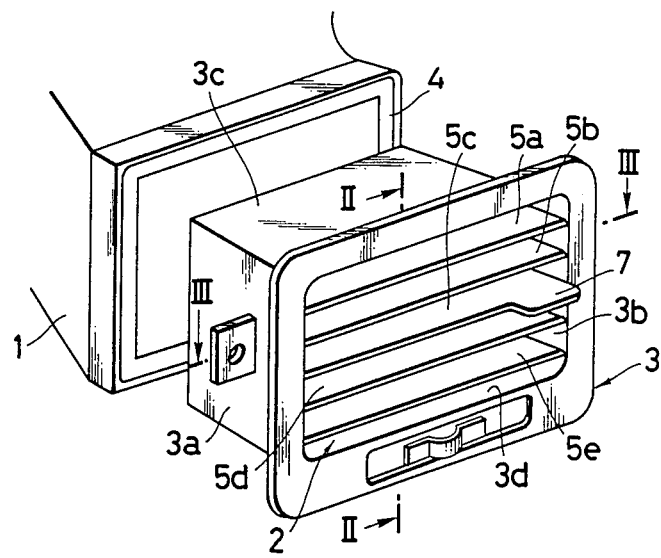
FIG. 2
PRIOR ART
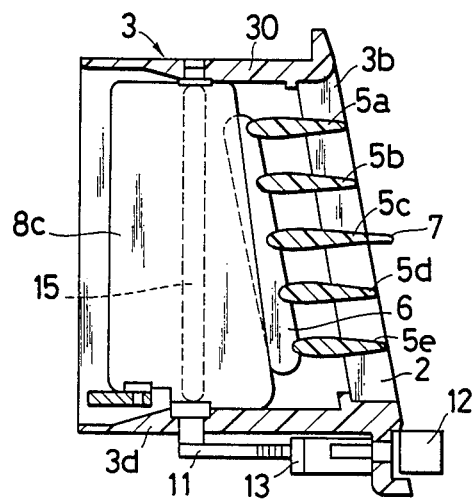

BLOWOUT APPARATUS

BACKGROUND OF THE INVENTION

1. Field of the Invention

The present invention relates to a blowout hole apparatus which is disposed in a ventilator duct in the air conditioning apparatus for motor vehicles, or the like, in order to regulate the blowout direction of the supplied air.

2. Description of the Prior Art

A prior-art blowout hole apparatus has a structure as shown in FIGS. 1 to 3 (see Japanese Laid-Open Utility Model No. 60-45115). At an end portion of a ventilator duct 1, there is provided a housing 3 that has a blowout hole 2 via a sealing member 4. In the housing 3, there are arranged a plurality of transverse louvers 5a, 5b, 5c, 5d, and 5e whose end portions on both sides are rotatably supported by the side walls 3a and 3b. The transverse louvers 5a, 5b, 5c, 5d, and 5e are linked mutually by a linking rod 6, and on the transverse louver 5c at the center there is provided a projecting knob 7. Further, within the housing 3, there are arranged a plurality of longitudinal louvers 8a, 8b, 8c, 8d, and 8e with their both ends rotatably supported by the top and the bottom walls 3c and 3d. On the longitudinal louvers 8a and 8e that are positioned on the left and right ends, there are formed flat plate portions 9, 9 extending respectively toward both side walls 3a and 3b. These longitudinal louvers 8a, 8b, 8c, 8d, and 8e are linked mutually by a linking rod 10. At the lower end portion of the longitudinal louver 8c that is situated at the center, there is provided a fan-shaped gear 11 which is linked to a knob 12 attached via a rack 13 slidably in the horizontal direction to the edge portion of the blowout hole 2.

In such a device, it is possible to regulate the pointing horizontal direction of the air that is blown out from the blowout hole 2 by turning each of the transverse louvers 5a, 5b, 5c, 5d, and 5e in the vertical direction through up and down operation of the knob 7 provided on the transverse louver 5c. In addition, by turning each of the longitudinal louvers 8a, 8b, 8c, 8d, and 8e in the horizontal direction through a sliding operation to the left or to the right of the knob 12, it is possible to regulate the blowing-out direction of the air. In this case, because of the provision of the flat plane portions 9, 9 on the longitudinal louvers 8a and 8e positioned on the left and right ends, the flows of air A1 and A2 that pass through between the longitudinal louvers 8a and 8e and the side walls 3a and 3b of the housing 3, as shown in FIG. 3, can be suppressed by the flat plane portions 9, 9. Therefore, the influence of the air flows A1 and A2 on the air flow A3 that passes through the spaces between the longitudinal louvers 8a, 8b, 8c, 8d, and 8e can be suppressed, and as a result, it is possible to improve the directivity of a desired blowing direction.

However, in such prior-art apparatuses, there exist inconveniences, although the air flows A1 and A2 between the side walls 3a and 3b and the longitudinal louvers 8a and 8e can be suppressed sufficiently effectively when the longitudinal louvers 8a, 8b, 8c, 8d, and 8e are nearly parallel to the side walls 3a and 3b, as shown by the broken line in FIG. 3, due to an effective utilization of the total areas of the flat plane portions 9, 9 that extend perpendicularly. Namely, when the longitudinal louvers 8a, 8b, 8c, 8d, and 8e are displaced by an angle as shown by the solid line in the figure, the flat plane portions 9, 9 are displaced by the same angle with the rotation of both louvers 8a and 8e, generating increasingly large gaps S1 and S2 between both side walls 3a and 3b and the flat plane portions 9, 9, accompanying the displaced angle of the flat plane portions 9, 9. Because of this, free air flows A1 and A2 through the gaps S1 and S2. In particular, the air flow A3, as shown by the broken line in the figure, between the longitudinal louvers 8a, 8b, 8c, 8d, and 8e, will be obstructed by the air flow A2 that passes through the gap S2. Because of this, the directivity of the air flow in a desired direction cannot sufficiently be accomplished sufficiently effectively.

SUMMARY OF THE INVENTION

An object of the present invention is to provide a blowout apparatus which can realize an improved directivity of blown air through the elimination of the increasing gaps.

In order to solve the above problems, according to the present invention, a blowout hole apparatus has a housing with a blowout hole inserted to an end section of a ventilator duct and has a plurality of longitudinal louvers and transverse louvers rotatably supported within the housing, and regulates the directivity of the air supplied from the blowout hole by the turning operation of the louvers. The blowout hole apparatus of the present invention has bulging portions with a semi-circular cross section formed on the longitudinal louvers positioned on both ends of horizontal direction along the side walls of the housing, with the turning axes of the longitudinal louvers being the centers of the semicircular bulging portions.

BRIEF DESCRIPTIONS OF THE DRAWINGS

FIG. 1 is a perspective view which shows a prior-art blowout apparatus;

FIG. 2 is a cross sectional view that corresponds to the II—II line of FIG. 1;

DETAILED DESCRIPTION OF THE PREFERRED EMBODIMENTS

Figure 3:
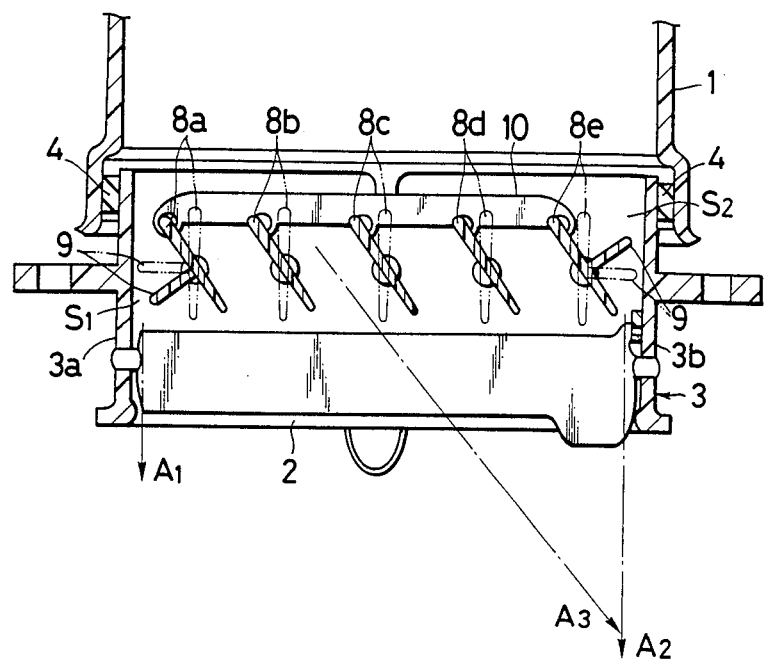
FIG. 3 is a cross sectional view that corresponds to the III—III line of FIG. 1.
Figure 4:
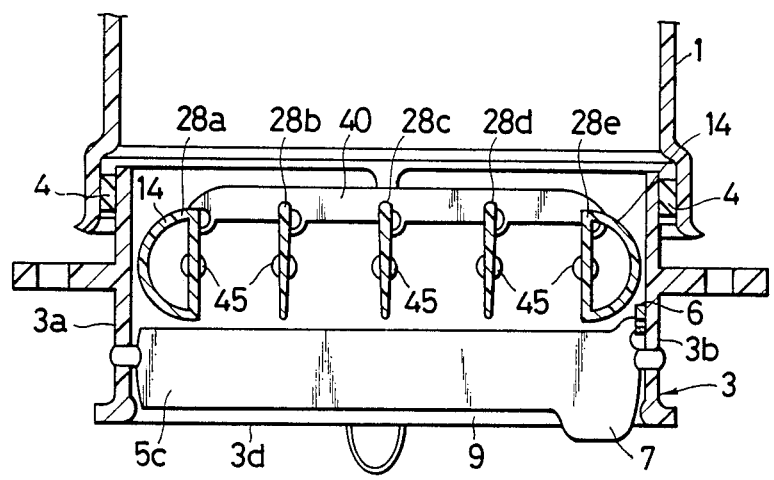
FIG. 4 is a cross section view of an embodiment of the blowout apparatus of the present invention that corresponds to FIG. 1.
Figure 5:
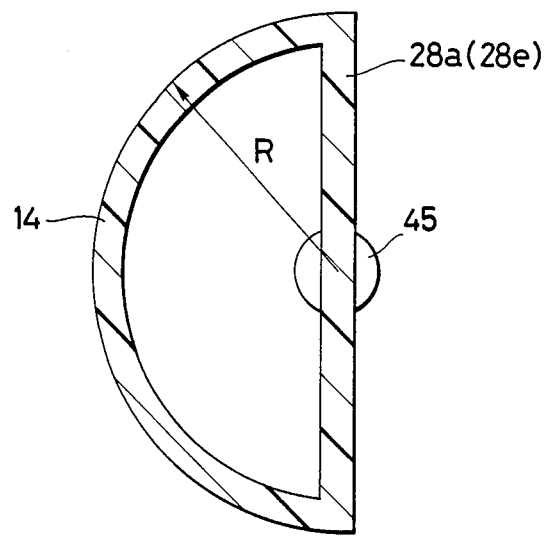
FIG. 5 is an enlarged cross sectional view of a bulging portion in accordance with the above embodiment.

Referring to FIG. 3 to FIG. 6, an embodiment of the present invention will be described. Namely, as shown in FIGS. 1 and 2, at an end of a ventilator duct 1, there is inserted a housing 3 with a blowout hole 2 via a sealing member 4. In the housing 3, there are arranged a plurality of transverse louvers 5a, 5b, 5c, 5d, and 5e that are rotatably supported by the side walls 3a and 3b. The transverse louvers 5a, 5b, 5c, 5d, and 5e are linked mutually, and a knob 7 is projected on a transverse louver 5c positioned at the center. Moreover, within the housing 3, there are arranged a plurality of longitudinal louvers 28a, 28b, 28c, 28d, and 28e whose both ends are rotatably supported by the top and bottom walls 3c and 3d. The longitudinal louvers 28a, 28b, 28c, 28d, and 28e are linked mutually by a linking rod 40, and at the lower edge of the longitudinal louver 28c positioned at the center there is provided a fan-shaped gear 11. The fan-shaped gear 11 is linked via a rack 13 to a knob 12 attached to the edge of the blowout hole 2 slidably in the horizontal direction. On the other hand, there are formed on the longitudinal louvers 28a and 28e positioned on the left and right ends, bulging portions 14, 14 that bulge along the side walls 3a and 3b of the housing 3, as shown in FIG. 4, formed on their entire lengths in united bodies. The bulging portions 14, 14 are hollow as shown enlarged in FIG. 5, and are formed in a semi-circular shape of radius R with the turning axes 45 of the longitudinal louvers 28a and 28b as the centers.

Figure 6:
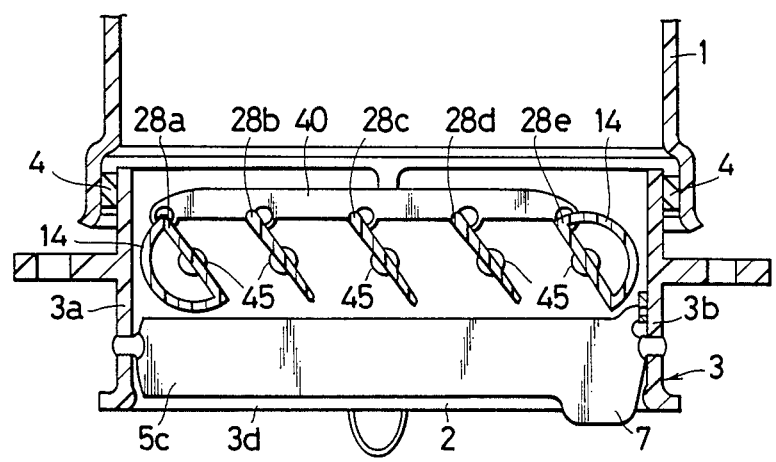
FIG. 6 is a cross sectional view that corresponds to FIG. 1, showing the operation of the above embodiment of the apparatus.

In the present embodiment with the above configuration, by up-down operation of the knob 7 on the transverse louver 5c, other transverse louvers 5a, 5b, 5d, and 5e are also turned in the vertical direction accompanying the motion of the linking rod 6, so that the directivity of the air blown out from the blowout hole 2 can be regulated. In addition, by left-right sliding operation of the knob 12, the longitudinal louver 28c at the center is turned together with the fan-shaped gear 11 by the motion of the rack 13, and the other longitudinal louvers 28a, 28b, 28d, and 28e linked with the longitudinal louver 28c via the linking rod 40 are also turned, so that the directivity in the horizontal direction of the air blown out from the blowout hole 2 can be regulated. In this case, the spaces between the longitudinal louvers 28a and 28e and the side walls 3a and 3b are kept blocked all the time because of bulging portions 14, 14 on the longitudinal louvers 28a and 28e along the side walls 3a and 3b, as shown in FIG. 4. Moreover, the bulging portions 14, 14 have semi-circular shape with the turning centers 45 of the louvers 28a and 28e as the centers, as mentioned. Therefore, as shown in FIG. 6, when the longitudinal louvers 28a, 28b, 28c, 28d, and 28e are turned, the bulging portions 14, 14 remain interposed between the side walls 3a and 3b and the longitudinal louvers 28a and 28e, without being displaced from the side walls 3a and 3b. Because of this, the air supplied from the draft air duct 1 is constantly prevented by the bulging portions 14, 14 from passing between the side walls 3a and 3b and the longitudinal louvers 28a and 28e on both ends in the horizontal direction, and hence, all the air pass through the spaces between the longitudinal louvers 28a, 28b, 28c, 28d, and 28e. As a result, the air blown out from the blowout hole 2 can be given a directivity that corresponds to the angle of rotation of the longitudinal louvers 28a 28b, 28c, 28d, and 28e, and can be blown out in a desired direction, without having the directivity of the air flow affected by the air (A1 and A2 of FIG. 3) passing through the spaces between the side walls 3a and 3b and the longitudinal louvers 8a and 8b.

As described in the foregoing, in the present invention there are formed, on the longitudinal louvers on both ends in the horizontal direction, bulging portions of semi-circular cross section that bulge along the side walls of the housing, with the turning axes of these longitudinal louvers as the centers. Therefore, the spaces between the side walls and the longitudinal louvers on both ends in the horizontal direction are kept blocked all the time. Because of this, air supplied from the draft air duct 1 does not pass through the spaces between the side walls and the longitudinal louvers situated on both ends in the horizontal direction, but instead passes exclusively through the spaces between the adjacent longitudinal louvers. As a result, there is obtained from the blowout hole an air flow directed solely in the direction that corresponds to the angle of rotation of the louvers, and hence, it is possible to improve the directivity of the air flow in a desired direction.

What is claimed is:

1. A blow-out apparatus, comprising:
    a housing having a blow-out port and provided with a plurality of pivotal shafts pivotally attached to the housing;
    a plurality of longitudinal louvers disposed within the housing and attached to the pivotal shafts, the longitudinal louvers for adjusting the horizontal direction of an air flow blown out of the blow-out port of the housing;
    a plurality of transverse louvers disposed within the housing and pivotally attached to the housing, the transverse louvers for adjusting the vertical direction of the air flow; and
    a bulging portion formed in each of the outermost longitudinal louvers which are positioned adjacent the side walls of the housing, each bulging portion having a generally semi-circular cross-sectional shape and having a vertical length, each bulging portion projecting toward a respective sidewall of the housing so as to prevent the air flow from flowing through the clearance between the vertical length of the bulging portion and the respective side wall of the housing.

2. A blow-out apparatus, comprising:
    a housing having top, bottom and side walls and a blow-out port; and
    an array of louvers for adjusting a flow of air blown out of the blow-out port of the housing, each louver being separately mounted on a respective shaft which is pivotally secured to the top and bottom walls of the housing, whereby each louver is pivotable with respect to the housing, the array of louvers comprising two outermost louvers, each positioned at a respective and of the array, each outermost louver having means for minimizing the passage of air between itself and a respective side wall of the housing, the minimizing means comprising a bulging portion bulging from the outermost louver into the space between the outermost louver and the respective side wall of the housing, the bulging portion being dimensioned so that the clearance between the bulging portion and the respective side wall at each pivoted position of the outermost louver is at least as narrow as the clearance between the bulging portion and the respective side wall when the outermost louver is parallel to the respective side wall.

3. A blow-out apparatus as claimed in claim 2 wherein the bulging portion is generally semi-circular in cross section.

* * * * *